United States Patent
Ouellette

(10) Patent No.: US 6,371,720 B1
(45) Date of Patent: Apr. 16, 2002

(54) PALLETIZER WITH OPERATION TIME REDUCING MODIFICATIONS

(75) Inventor: Joseph F. Ouellette, Glendale, MO (US)

(73) Assignee: Ouellette Machinery Systems, Inc., Fenton, MO (US)

( * ) Notice: Subject to any disclaimer, the term of this patent is extended or adjusted under 35 U.S.C. 154(b) by 0 days.

(21) Appl. No.: 09/337,381

(22) Filed: Jun. 21, 1999

Related U.S. Application Data

(60) Provisional application No. 60/090,188, filed on Jun. 22, 1998.

(51) Int. Cl.[7] .......................... B65G 60/00; B65G 57/10
(52) U.S. Cl. .................................. 414/791.6; 414/792.7
(58) Field of Search ............................... 414/788–795.3

(56) References Cited

U.S. PATENT DOCUMENTS

| | | | |
|---|---|---|---|
| 2,744,489 A | 12/1956 | Guigas | 414/791.7 X |
| 3,770,143 A * | 11/1973 | Breitbach | 414/788.8 |
| 3,780,884 A | 12/1973 | Jones | |
| 3,844,422 A | 10/1974 | Smith et al. | |
| 3,954,190 A | 5/1976 | Howard et al. | |
| 3,974,922 A | 8/1976 | Selusnik et al. | |
| 4,058,225 A | 11/1977 | Janson | |
| 4,127,264 A * | 11/1978 | Fayolle | 414/793.5 X |
| 4,197,046 A | 4/1980 | Shank | |
| 4,214,848 A | 7/1980 | Verwey et al. | |
| 4,557,656 A | 12/1985 | Ouellette | |
| 4,861,226 A * | 8/1989 | Dorner et al. | 414/790.2 X |

\* cited by examiner

Primary Examiner—Robert P. Olszewski
Assistant Examiner—Gerald J. O'Connor
(74) Attorney, Agent, or Firm—Thompson Coburn LLP

(57) ABSTRACT

An apparatus that is one part of a conveying system for transferring objects, such as bottles, where the apparatus arranges the objects in layers on a pallet is improved by the addition of sensors that provide early indications of movements of component parts of the apparatus to a control unit of the apparatus where the signals are used in a more time efficient operation of the apparatus.

25 Claims, 7 Drawing Sheets

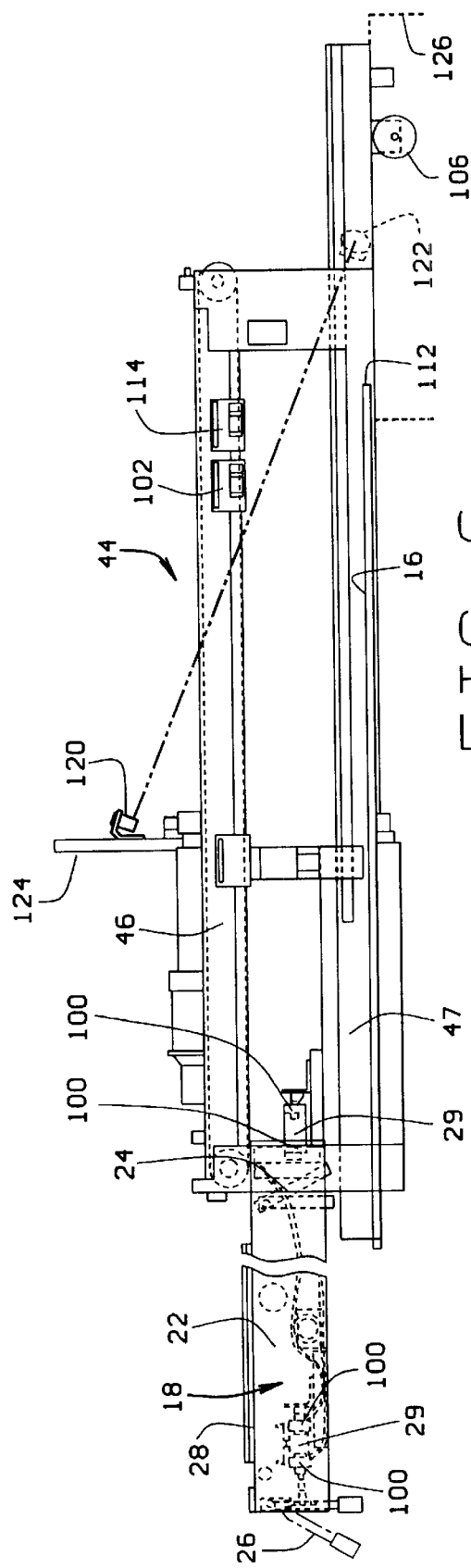
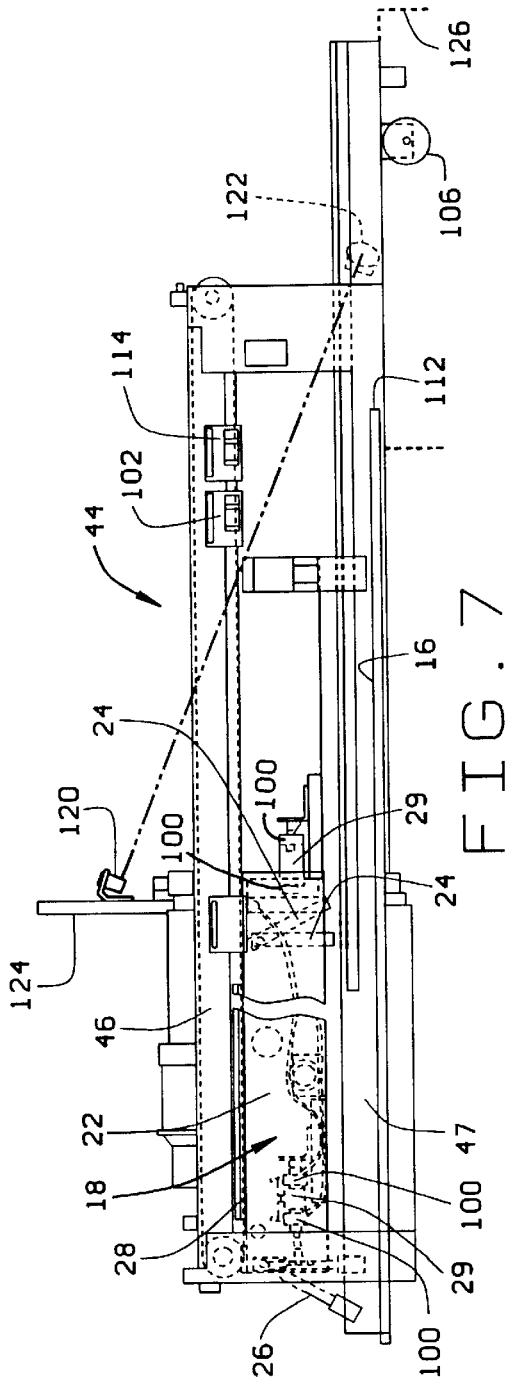

PALLETIZER WITH OPERATION TIME REDUCING MODIFICATIONS

This application claims the benefit of Provisional Application Ser. No. 60/090,188, filed Jun. 22, 1998, now abandoned.

BACKGROUND OF THE INVENTION (1) Field of the Invention

The present invention pertains to an apparatus that is one part of a conveying system for transferring objects, such as bottles, where the apparatus arranges the objects in layers on a pallet. In particular, the present invention pertains to an apparatus that is employed to palletize objects, where improvements result in more time efficient operation of the apparatus.

(2) Description of the Related Art

Many containers such as bottles, cans, jars, jugs, etc. are packaged on pallets for transportation from a manufacturer to a user of the containers or objects. The pallet loads often include layers of the objects, each separated by a paperboard slipsheet, stacked on top of a pallet constructed of wood. The layers of objects and the slipsheets on which the layers rest are secured on the top surface of the pallet by banding, plastic sheet wrap or by other equivalent methods. The pallet loads facilitate the transportation of a significant number of the objects on each pallet load from the manufacture of the objects, through distribution and ultimately to the end user of the objects.

In many conveyor systems in which objects are loaded onto pallets, the faster the system can operate to load pallets the more cost efficient is its operation. With manual loading of pallets being long recognized as slow and expensive, a number of different types of machines have been developed over time that quickly perform the function of unloading and/or loading pallets. These machines are referred to as depalletizers and/or palletizers in the conveying industry. Examples of these types of machines are described in U.S. Pat. Nos. 2,774,489, 3,780,884; 3,844,422; 3,954,190; 3,974,922; 4,058,225; 4,197,046; 4,214,848, and 4,557,656 the disclosures of all of which are incorporated herein by reference.

FIG. 1 is a schematic representation depicting a palletizer apparatus that comprises many features found in other prior art apparatus. The machine shown in FIG. 1 includes an object infeed section A, an elevator section B, and an object outfeed section C. As stated earlier, machines of this type are known in the prior art and various examples of these machines are disclosed in the above-listed patents. In order to simplify the explanation of the construction and operation of these types of machines the drawing of the machine in FIG. 1 has been simplified, deleting many of the intricate component parts of the machine, examples of which are disclosed in the above-listed patents, that enable the machine to function in the manner to be described. The machine will be described as palletizing objects, in this case plastic blow-molded bottles as shown in FIG. 1. It should be understood that "objects" is intended to mean any of the various different types of objects that may be transported in pallet loads and is not intended that the interpretation be limited to plastic bottles.

The sections of the machine shown in FIG. 1 are all supported by a framework 10. At the object infeed section A, the framework supports the end of a supply conveyor 12 depicted as a belt and pulley conveyor. However, any other type of known supply conveyor may be employed to transport objects to the machine infeed section A. As depicted in FIG. 1, the supply conveyor 12 has transported a layer of objects into the object infeed section A. Conveyors of palletizers of this type usually have side rails (not shown) and depending, vertically reciprocated gates (not shown) that arrange a plurality of the objects into a generally square grouping that is dimensioned to cover a majority of the load supporting surface of a pallet onto which the objects are to be loaded. The grouping of objects 14 arranged on the supply conveyor 12 will comprise one layer of objects to be loaded onto a pallet by the palletizer. When the supply conveyor 12 has conveyed the grouping of objects 14 into the infeed section A and adjacent the elevator section B, the programmable control unit of the palletizer (CU) controls the motor or drive system M for the supply conveyor 12 to stop the conveyor with the grouping of objects adjacent the elevator section B.

Positioned in the elevator section B is an elevator platform 16 having a drive system M that is controlled by the control unit to move vertically in the elevator section B and, to a limited extent, to move horizontally. The elevator platform 16 is part of a carriage assembly of the palletizer, where the carriage assembly is mounted in the frame 10 and is driven by its drive system to move vertically through the elevator section B. The elevator platform 16, being mounted on the carriage assembly, moves vertically with the carriage assembly through the elevator section B and also moves horizontally to a limited extent relative to the carriage assembly.

A sweeper assembly 18 is also mounted on the carriage assembly for vertical movement with the carriage assembly. In addition, the sweeper mechanism 18 is mounted on the carriage assembly for horizontal movement of the sweeper mechanism 18 across the carriage assembly between the infeed section A, the elevator section B, and the object outfeed section C. Therefore, the sweeper mechanism 18 not only moves vertically with the elevator platform 16 as the carriage assembly moves vertically, but may also move horizontally relative to the elevator platform 16. The sweeper mechanism 18 has a pair of side flaps 22, a front flap 24 and a rear flap 26 mounted for pivoting movement about the top edges of the four flaps. The top edges of the four flaps are suspended from four edges of a base 28 of the sweeper mechanism 18. The base 28 is generally rectangular so that when the four flaps are moved to depend straight downward from the base 28 they define a square that extends around the grouping of objects 14. The pivoting movement of the flaps is controlled by actuators M that are controlled by the control unit of the palletizer to move the pair of side flaps 24 upwardly and move the front 24 and rear 26 flaps upwardly.

An end of an output conveyor 30 is supported in the palletizer frame in the object outfeed section C. The output conveyor 30 in the preferred embodiment is a chain and sprocket conveyor. Conveyors of this type are known in the art and are generally comprised of shafts with two or more sprockets mounted on the shaft in a spaced apart relation. The shafts are positioned parallel to each other in a spaced arrangement along the conveying length of the conveyor. Loops of chain are meshed between the sprockets of adjacent shafts. In prior art FIG. 1, the sprockets 32 and loops of chain 34 are represented schematically. The drive system for the output conveyor 30 is controlled by the control unit to selectively rotate the shafts and their sprockets 32, thereby causing the chains 34 around the sprockets to convey objects, such as the pallet 36 shown in FIG. 1, on the output conveyor 30.

The output conveyor 30 shown in FIG. 1 conveys a pallet 36 loaded with layers of objects 14 out of a loading station 38 in the object outfeed section C of the palletizer. However, before the pallet 36 is loaded with layers of objects by the palletizer, an empty pallet 36, with a slipsheet 40 positioned thereon, must first be moved into the loading station 38 of the outfeed section C. An empty pallet with its slipsheet is usually conveyed into the loading station 38 by a pallet input conveyor (not shown). In the schematic representation of the palletizer shown in FIG. 1, the supply conveyor 12, the elevator platform 16 and the output conveyor 30 are all arranged in a longitudinal line from left to right. The empty pallet input conveyor in systems such as that shown in FIG. 1 is usually positioned to a lateral side of the object outfeed section C so that it will supply an empty pallet and slipsheet in a lateral direction onto the output conveyor 30 at the loading station 38 in the object outfeed section C of the palletizer. As shown in FIG. 1, the pallet input conveyor would be positioned in a perpendicular orientation relative to the output conveyor 30 on either the side of the loading station 38 shown in FIG. 1 or on the opposite side. Therefore, an empty pallet is supplied to the loading station 38 by the pallet input conveyor by being conveyed in a first direction into the loading station 38 and onto the chains 34 of the output conveyor 30, and the loaded pallet is conveyed by the output conveyor 30 in a second direction that is oriented at a right angle to the first conveyor direction of the empty pallet input conveyor.

In the prior art palletizer apparatus shown in FIG. 1, several sensors are mounted at key positions on the palletizer to detect the movement of component parts of the palletizer as well as the empty pallets, layers of objects being loaded onto the pallets, and loaded pallets in controlling the sequential operation of the palletizer. The information determined by these sensors is monitored by the palletizer control unit and the control unit controls the systematic operation of the drive systems of the several palletizer components. Various different types of sensors are employed such as photo sensors and mechanical sensors. The photo sensors are typically photo emitters and reflectors that are mounted on the palletizer spaced from each other. A light beam is emitted by the photo emitter to the photo receptor and the reflection of the light beam is sensed by the photo emitter. However, when the light beam is interrupted by either a component part of the palletizer, a layer of objects being palletized, or a pallet, this interruption is also conveyed to the control unit where the information is employed in controlling the operation of the component parts of the palletizer. The mechanical sensors employed are typically switches that are contacted by a component part of the palletizer or the objects or pallets, which contact activates the switch and sends a signal to the control unit of the palletizer informing the control unit that contact has occurred. The control of palletizers by programmable computerized control units and by sensors such as those discussed above is well known in the prior art and, in order to simplify the description of the improvements provided by the present invention, will only be described generally without going into intricate detail.

SUMMARY OF THE INVENTION

The present invention provides improvements to the palletizing apparatus of the prior art described above that enable certain operative sequences of the prior art palletizer to occur quicker, thereby increasing the overall speed by which the palletizer positions an empty pallet into the loading station, loads layers of objects onto the empty pallet in the loading station and then conveys the loaded pallet from the loading station to again restart the sequence by conveying an empty pallet into the loading station. By enabling certain operating sequences of the palletizer to occur in less time, sometimes only reducing the operating time of the sequence by a few seconds, the improvements provided by the present invention can significantly increase the efficiency of operation of the palletizer when the palletizer is operated continuously over an extended period of time, for example an eight hour work shift.

One of the improvements provided by the present invention is made to the empty pallet input conveyor. The empty pallet input conveyor is a sprocket and chain conveyor, similar to the full pallet output conveyor. The empty pallet input conveyor and the full pallet output conveyor intersect each other at right angles. Because these two conveyors intersect, they cannot be operated simultaneously. Furthermore, in the prior art palletizer the empty pallet input conveyor was operated to retract below the level of the conveyor chains of the full pallet output conveyor after an empty pallet had been conveyed into the loading station. With the conveying chains of the full pallet output conveyor positioned above the conveying chains of the empty pallet input conveyor, the output conveyor could be operated to convey a loaded pallet out of the loading station without interference from the chains of the input conveyor. However, once the full pallet left the loading station, the input conveyor would be elevated so that its chains were positioned above those of the output conveyor to enable an empty pallet to be conveyed by the input conveyor into the loading station. However, to avoid interfering with the chains of the full pallet output conveyor conveying a loaded pallet from the loading station, the chains of the empty pallet input conveyor could not be elevated until the loaded pallet had completely cleared the loading station. Therefore, the conveying of an empty pallet into the loading station could not begin to occur until the loaded pallet had completely cleared the loading station.

An improvement provided by the present invention divides the empty pallet input conveyor into first and second sections where the second section intersects with the full pallet output conveyor. The first and second sections of the empty pallet input conveyor could be elevated separately and in sequence with the first section adjacent the full pallet output conveyor being elevated first and the second section intersecting the full pallet output conveyor being elevated sequentially second. This enables the first section of the empty pallet input conveyor to be elevated and the drive system activated to begin conveying an empty pallet toward the loading station of the output conveyor while the output conveyor was still conveying a loaded pallet out of the loading station. This early activation of the empty pallet input conveyor drive system enables an empty pallet to be loaded into the loading station seconds earlier than the prior art empty pallet input conveyor. Over an extended period of time of operation of the palletizing apparatus these saved seconds would amount to a significant savings in time and a more efficient operation of the palletizing apparatus.

In the prior art palletizer the object supply conveyor is elevated slightly above the output conveyor. This relative positioning of the supply and output conveyors would distribute the total range of vertical movement of the elevator platform and the sweeper mechanism below and above the supply conveyor. When initially positioning a first layer of objects to be loaded onto an empty pallet positioned in the loading station of the palletizer, the control unit would first have to determine if an empty pallet was present in the loading station. This was accomplished by a photo sensor in the loading station that would detect a pallet when the pallet was positioned in the loading station. When the elevator mechanism receives a first layer of objects from the supply conveyor by the sweeper mechanism, the downward movement of the elevator mechanism would not commence until the control unit received a signal from the sensor switch in the loading station indicating that an empty pallet was positioned in the loading station. Upon receiving this signal, the control unit would then cause the elevator mechanism drive system to vertically lower the elevator platform until it would contact a mechanical switch at the bottom of the elevator section B indicating that the elevator platform had arrived at the bottom of the elevator section and was adjacent the empty pallet. Therefore, in the prior art palletizer, the downward movement of the elevator mechanism would not commence until the sensor in the loading station communicated to the control unit that an empty pallet was positioned in the loading station.

The present invention adds a second sensor in the form of a mechanical switch in the elevator section B, where the second sensor switch is positioned a short distance vertically above the switch at the bottom of the elevator section that senses when the elevator platform is adjacent the empty pallet. In addition, the control unit is reprogrammed so that, the elevator platform, having a layer of objects swept thereon by the sweeper mechanism, begins its vertically downward movement before the control unit determines the presence or absence of an empty pallet in the loading section. However, when the elevator platform reaches the added sensor switch and trips this switch, the control unit then determines the presence or absence of an empty pallet in the loading section. If the presence of a pallet in the loading section is communicated to the control unit by the sensor in the loading section, then the elevator platform continues with its vertically downward movement until it trips the second, lower switch at the bottom of the elevator section where the elevator platform is positioned adjacent the empty pallet. However, if the elevator platform trips the added switch in the elevator section and the control unit determines that an empty pallet has not yet been loaded into the loading section, then the downward movement of the elevator platform is stopped by the control unit until the control unit receives a signal from the switch in the loading station indicating that an empty pallet has been loaded into the loading station. By adding the additional switch to the elevator section, the elevator platform can begin its downward movement before the control unit determines whether or not an empty pallet is present in the loading station. This modification also results in the savings of small increments of time, for example, seconds. However, when measured over the continuous operation of the palletizer for an extended period of time, for example an 8 hour shift, the savings of time becomes substantial.

Additional time saving improvements are provided on the carriage assembly that supports the elevator platform 16 and the sweeper mechanism 18. In operation of the prior art carriage assembly, after the sweeper mechanism 18 had swept a layer of objects onto the elevator platform 16, the carriage assembly would vertically position the elevator platform adjacent either the empty pallet or a slipsheet covering a layer of objects loaded onto the empty pallet. In positioning the elevator platform 16, the drive system of the carriage assembly would first move the elevator platform 16 horizontally forward toward the loading station so that a forward edge of the elevator platform 16 would slightly overlap the empty pallet or the slipsheet covering a layer of objects on the pallet. The carriage mechanism control system would then control the elevator platform 16 and sweeper mechanism 18 to move downwardly a short distance so that the forward edge of the elevator platform was resting on or just above the empty pallet or slipsheet covering a layer of objects on the pallet. This would ensure that there was not a gap between the forward edge of the elevator platform and the pallet or slipsheet before the sweeper mechanism 18 was controlled to move horizontally to sweep the layer of objects off the elevator platform 16 and onto the pallet or slipsheet.

The present invention improves the operation of the prior art carriage assembly by adding an additional sensor that senses the horizontal position of the sweeper mechanism and allows it to move with the elevator platform when the carriage is moving downward toward the pallet or slipsheet. The control unit controls the drive system of the carriage assembly to move the elevator platform and sweeper mechanism downward as they are continued to move horizontally toward the added horizontal sensor and the pallet or slipsheet. As a result, the sensor mechanism 18 and the elevator platform 16 move diagonally downward and toward the pallet or slipsheet in the improved operation of the carriage assembly instead of moving horizontally toward the pallet or slipsheet and then downwardly toward the pallet or slipsheet. This modification also results in the savings of small increments of time. However, when multiplied over the continuous operation of the palletizer for an extended period of time, the savings of time becomes substantial.

A still further time saving modification of the carriage assembly adds a photo sensor and receptor to the carriage assembly that gives the control unit an early indication that the carriage assembly is about to clear a top layer of objects on a pallet stack when the carriage is moving upwardly. This early indication reduces the time required to reverse the carriage movement from upward movement to downward movement. Again, the modification results in the savings of small increments of time. However, when measured over the continuous operation of the palletizer for an extended period of time, the savings of time becomes substantial.

DESCRIPTION OF THE DRAWINGS

Further objects and features of the present invention are revealed in the following detailed description of the preferred embodiment of the invention and in the drawing figures, wherein:

FIGS. 6–8 are side elevation views of the carriage assembly; and

DETAILED DESCRIPTION OF THE PREFERRED EMBODIMENT

Figure 1:
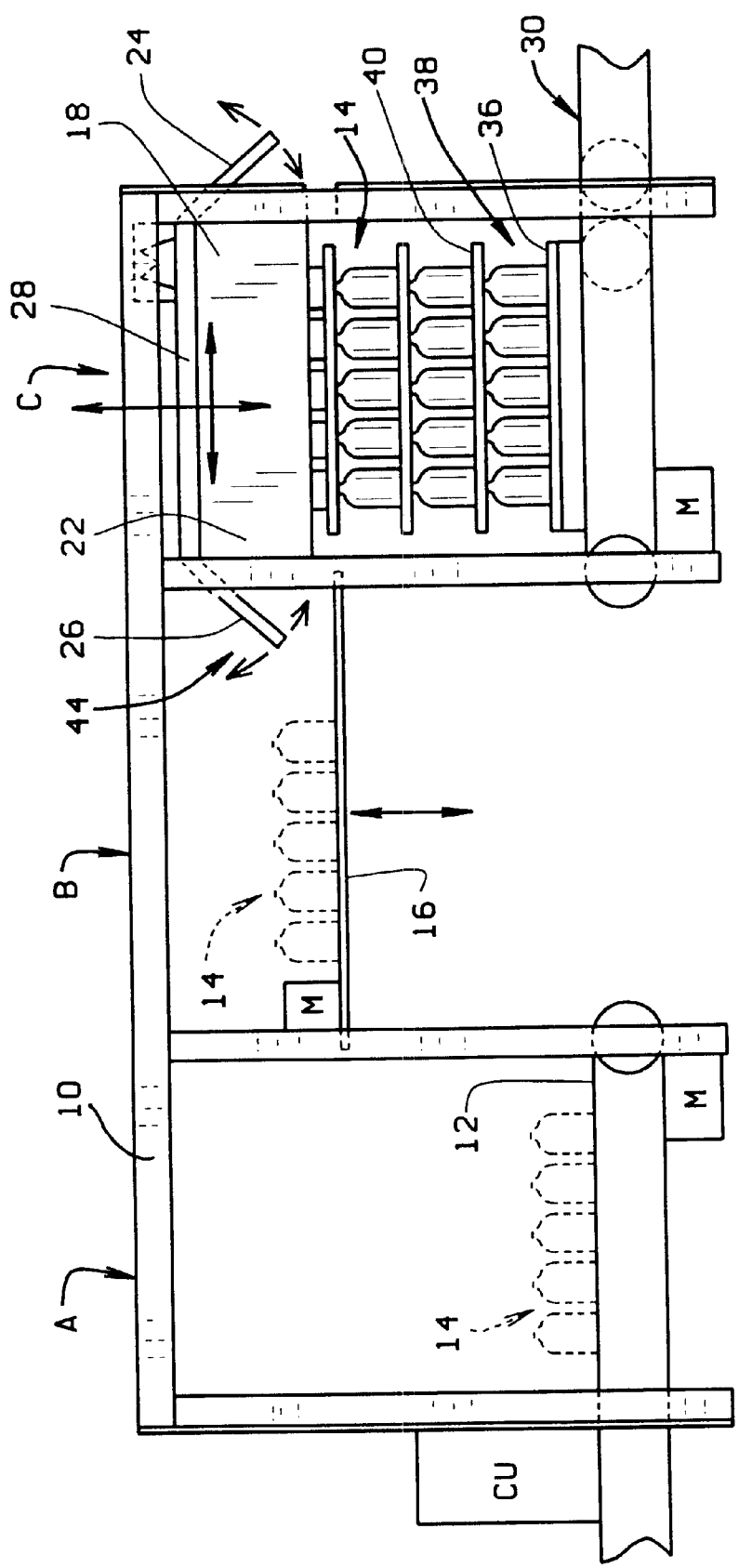
FIG. 1 is a schematic representation of a prior art palletizing machine to which the improvements of the invention are added.
Figure 2:
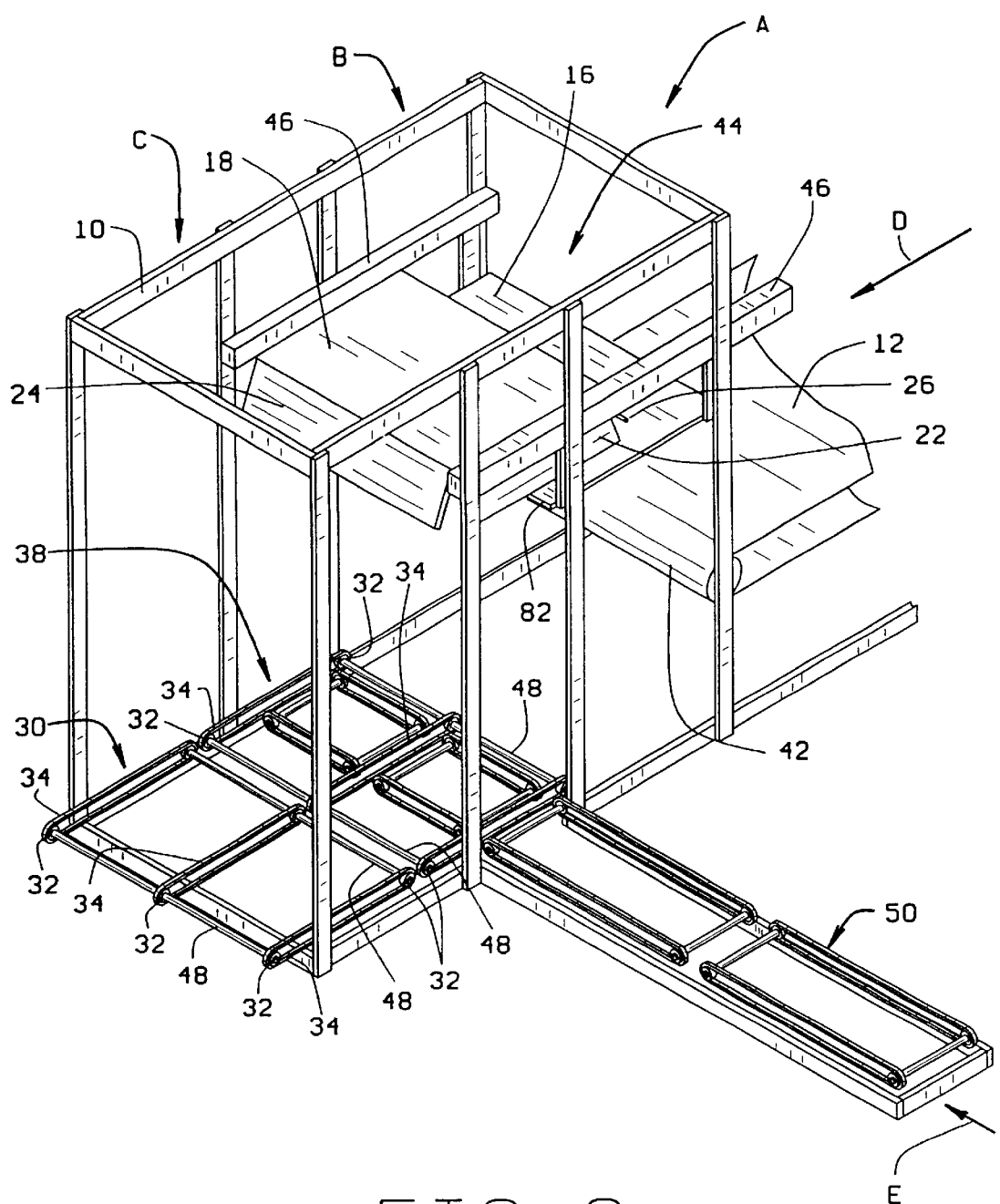
FIG. 2 is a schematic perspective view of the palletizer of FIG. 1.

FIG. 2 is a schematic representation of the typical construction of a prior art palletizing apparatus such as that also shown in FIG. 1. The apparatus includes an object infeed section A, an elevator section B, and an object outfeed section C. The component parts of the apparatus are supported by a framework 10. The object supply conveyor 12 has been shown as a belt and pulley conveyor, however other types of conveyors may be employed as explained earlier. Also as explained earlier, the supply conveyor 12 is operated to transport a grouping of objects into the object infeed section A that will be palletized as a layer of objects on a pallet by the apparatus. The objects approach the palletizer in a longitudinal direction represented by the arrow D. The objects are conveyed by the supply conveyor 12 until they approach the forward edge 42 of the conveyor where the objects will be stopped by a vertically reciprocating gate (not shown) and the supply conveyor will be stopped by the apparatus control unit.

The carriage assembly 44 is generally comprised of pairs of side rails 46, 47 that are controlled to move vertically in the apparatus frame 10 by the carriage assembly drive system (not shown). Mounted on the carriage assembly side rails 46 is the sweeper mechanism 18 and mounted on the other pair of rails 47 is the elevator platform 16. As explained earlier, the drive system of the carriage assembly 44 also drives the elevator platform 16 and is controlled by the control unit of the apparatus to move the elevator platform vertically in the elevator section B and, to a limited extent, horizontally. The elevator platform 16 moves vertically in the elevator section B as the carriage assembly 44 is moved vertically and also moves horizontally through its limited range of movement relative to the carriage assembly.

The sweeper mechanism 18 also moves vertically in the elevator section B with the carriage assembly 44. In addition, the sweeper mechanism 18 is mounted on the side rails 46 of the carriage assembly for horizontal movement along the side rails from a position over the supply conveyor 12 in the infeed section A, to a position over the elevator platform 16 in the elevator section B, and to a position over the loading station 38 of the loaded pallet output conveyor 30. The sweeper mechanism 18 has a pair of side flaps 22, a front flap 24 and a rear flap 26 that are mounted to a rectangular base 28 of the sweeper mechanism for pivoting movement about the top edges of the four flaps. The four flaps are suspended from the four edges of the base 28 so that when they are moved to depend straight downward from the base they define a square that extends around the grouping of objects being swept by the sweeping mechanism. The pivoting movement of the flaps is controlled by pneumatic actuators 29 that are controlled by the apparatus control unit. The pair of side flaps 22 and the rear flap 26 are controlled by their actuators to pivot only a slight distance outwardly from their straight downward orientations. The forward flap 24 pivots to a position where it extends substantially horizontally from the base 28 in order to enable the flap to pass over objects as the sweeper mechanism 18 is retracted from over a layer of objects loaded onto a pallet in the loading station 38.

As explained earlier, the output conveyor 30 is a chain and sprocket conveyor of a type that is known in the art. The conveyor is basically comprised of several shafts 48 that are positioned parallel to each other in a spaced arrangement along the conveying length of the conveyor that extends along the longitudinal line D. As shown, each of the shafts has three sprockets 32 mounted thereto. Loops of chain 34 are meshed between the sprockets of adjacent shafts. The drive system (now shown) for the output conveyor is typically an electric motor that is controlled by the palletizer control unit to selectively rotate the shafts 48 and thereby their sprockets 32 which in turn causes the chains 34 to convey objects, such as a pallet supported on the chains of the output conveyor. It can be seen in FIG. 2 that the output conveyor 30 is actually comprised of two sections with each section having three chain loops 34 stretch between pairs of sprockets 32. With each section positioned adjacent each other, a loaded pallet supported on the chains of the output conveyor can be transported from the loading station 38 and longitudinally along the output conveyor 30.

FIG. 2 also shows an empty pallet input conveyor 50 positioned at one side of the palletizing apparatus. The empty pallet input conveyor 50 conveys empty pallets into the loading station 38 of the palletizer along a lateral line of travel represented by the arrow E. Therefore, the empty pallet input conveyor 50 is positioned in a perpendicular orientation relative to the output conveyor 30 and intersects with the output conveyor in the loading station 38. Because the input conveyor 50 and output conveyor 30 intersect, they cannot be operated at the same time. Therefore, in prior art input conveyors 50 the entire lateral length of the conveyor would be raised so that the chains 56 of the conveyor are slightly above the chains 34 of the output conveyor. This enables the input conveyor 50 to pass an empty pallet over the chains 34 of the output conveyor when loading an empty pallet into the loading station 38. Once the pallet was positioned in the loading station 38, the control unit of the palletizer would cause the input conveyor 50 to lower, thus lowering the chains 56 of the input conveyor below the chains 34 of the output conveyor 30, thereby supporting the loaded empty pallet on the chains 34 of the output conveyor. As in the output conveyor 30, the input conveyor 50 is also comprised of several parallel shafts 52 having spaced sprockets 54 secured therein. Loops of chains 56 extend between pairs of sprockets on adjacent shafts 52.

The palletizing apparatus shown schematically in FIGS. 1 and 2 and described above to this point is typical of many palletizing apparatus known in the prior art. As stated earlier, the present invention provides improvements to the palletizing apparatus of the prior art that enable certain operative sequences of the palletizer to occur quicker, thereby increasing the overall speed by which the palletizer positions an empty pallet into the loading station, loads layers of objects onto the empty pallet in the loading station, and then conveys the loaded pallet from the loading station to again restart the sequence by conveying an empty pallet into the loading station. By enabling certain sequences of the palletizer to occur in less time, sometimes only reducing the operating time of the sequence by a few seconds, the improvements provided by the present invention can significantly increase the efficiency of operation of the palletizer when the palletizer is operated continuously over an extended period of time, for example, an 8 hour work shift.

One of the improvements provided by the present invention was made to the empty pallet input conveyor 50. As explained earlier and as shown in FIGS. 2 and 3, like the output conveyor, the empty pallet input conveyor is comprised of several shafts 52 having sprockets 54 fixed thereto. Loops of chain 56 extend around pairs of sprockets 54 of adjacent shafts 52. The empty pallet input conveyor 50 of the invention is divided into first and second sections. The first section is comprised of two segments 58, 60 of the input conveyor, each segment comprising a pair of shafts 52 with sprockets 54 thereon and a pair of chains 56 looped around the sprockets. As can be seen in the drawing figures, these first two segments 58, 60 of the first section of the input conveyor 50 are positioned adjacent the output conveyor 30 but do not intersect with the output conveyor. The second section of the input conveyor is also comprised of two segments 62, 64, with each segment comprising a pair of shafts 52 and their sprockets 54 and a pair of chains 56 looped around the shafts. The two segments 62, 64 of the input conveyor second section do intersect with the output conveyor 30. The two segments 58, 60 of the first section of the input conveyor are controlled by the control unit of the palletizing apparatus to be raised and lowered relative to the output conveyor 30 independent of the two segments 62, 64 of the second section of the input conveyor. The two segments 58, 60 of the input conveyor first section are supported on their own framework that, in turn, is supported on four pneumatic actuators 66. In a like manner, the two segments 62, 64 of the input conveyor second section have their own framework that is supported on four pneumatic actuators 68. By selective activation of the two groups of pneumatic actuators 66, 68, the control unit of the palletizing apparatus can elevate and lower the two sections of the input conveyor separately. The control unit controls the activation of the pneumatic actuators to raise the first section of the input conveyor comprised of the first segments 58, 60 in sequence with the second section of the input conveyor comprised of the second segments 62, 64 to first raise the first section and then raise the second section when loading an empty pallet into the loading station 38 while a previously loaded pallet is being conveyed out of the loading station 38 by the output conveyor 30. This enables the first section 58, 60 of the empty pallet input conveyor to be elevated and its drive system activated to begin conveying an empty pallet toward the loading station 38 of the output conveyor while the output conveyor 30 is still conveying a loaded pallet out of the loading station. It is no longer necessary for the loaded pallet to completely clear the loading station 38 before the input conveyor 50 is activated as was in the prior art. This early activation of the empty pallet input conveyor 50 enables an empty pallet to be loaded into the loading station seconds earlier than the prior art empty pallet input conveyor.

Figure 3:
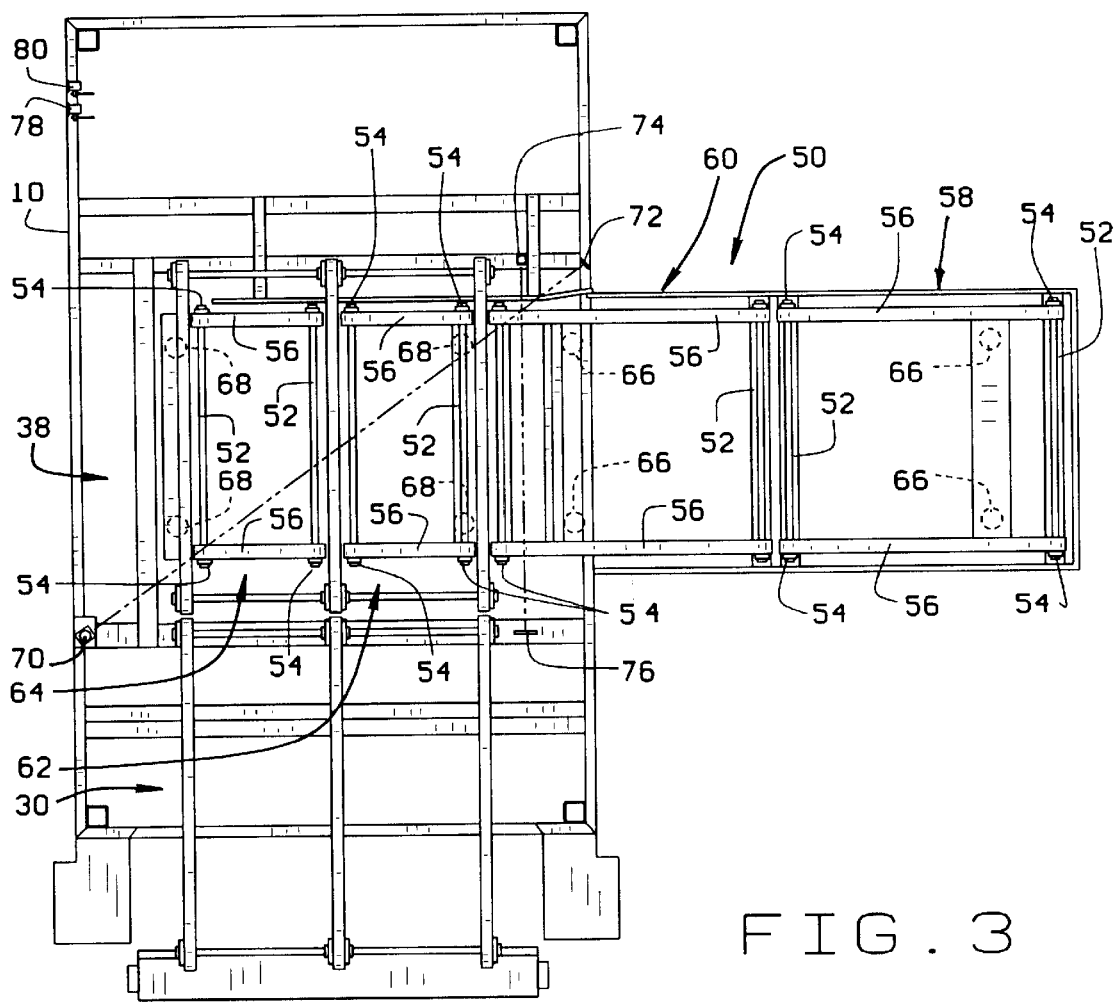
FIG. 3 is a plan view of the empty pallet input conveyor and loaded pallet output conveyor of the palletizer.
Figure 4:
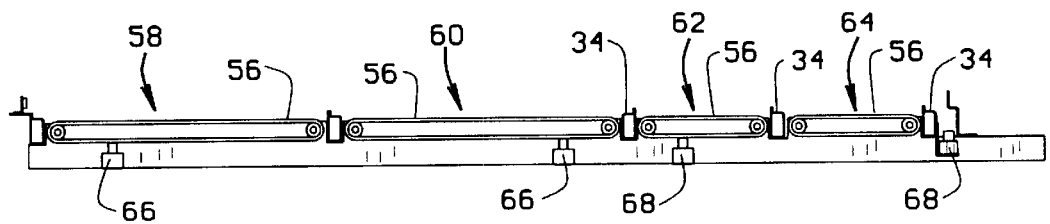
FIG. 4 is a side elevation view of the empty pallet input conveyor.
Figure 5:
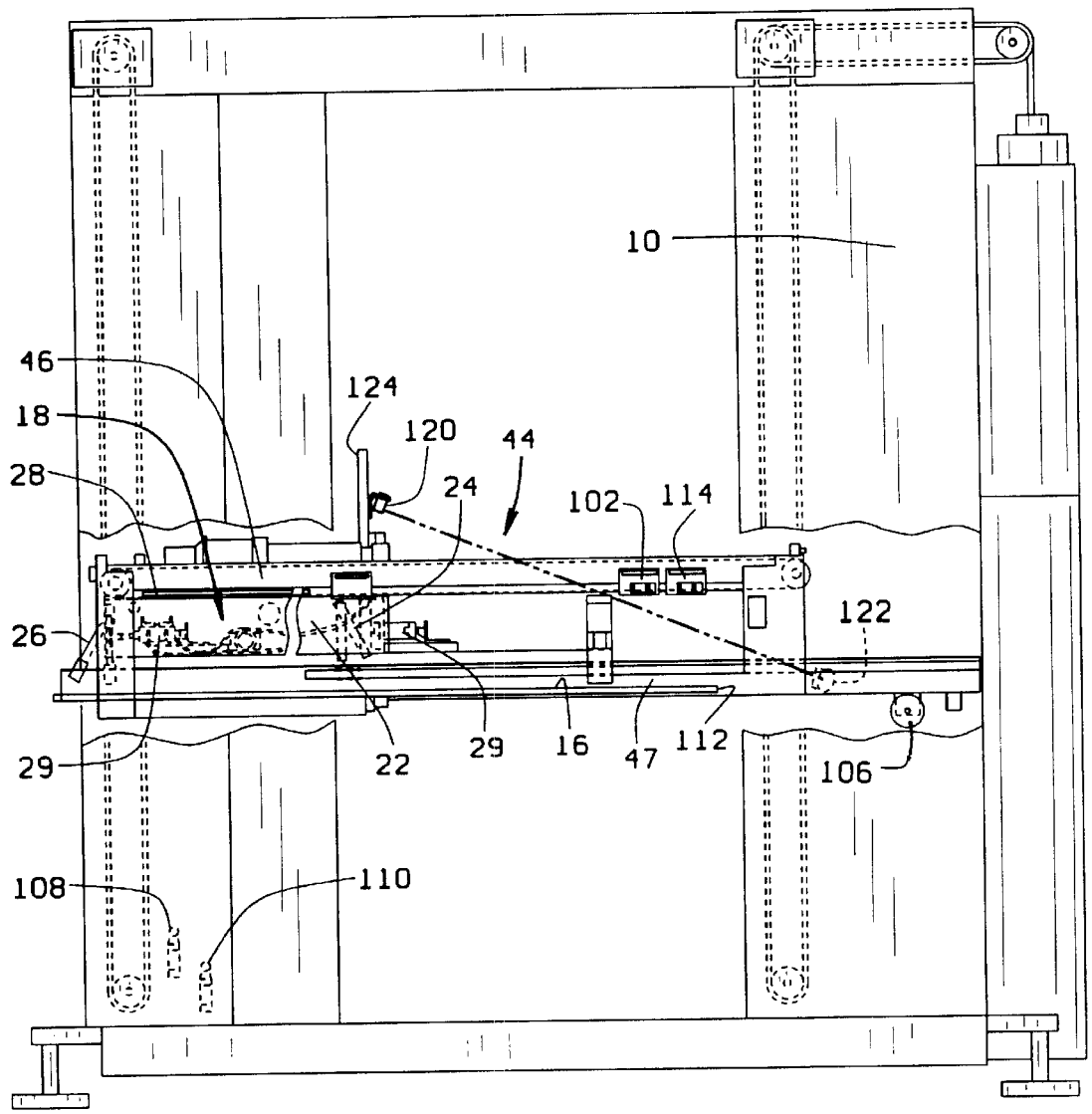
FIG. 5 is a fragmented side elevation view of the elevator section and carriage assembly of the palletizer.

In the prior art output conveyor a photo emitter and its receptor were positioned on opposite sides of the output conveyor and adjacent the loading station 38. When the beam emitted from the photo emitter toward the reflector was interrupted by a loaded pallet being conveyed out of the loading station and then was re-established once the loading pallet had been conveyed completely onto the output conveyor, the re-establishment of the beam would send a signal to the palletizer control unit that the loading station was cleared and the empty pallet input conveyor could be activated to transport an empty pallet into the loading station. The present invention provides an improvement to this prior art arrangement that sends an earlier signal to the control unit informing the control unit that the loaded pallet is about to clear the loading station 38 and that the first section of input conveyor segments 58, 60 can be raised and activated to begin transporting an empty pallet into the loading station 38. This is accomplished by the photo emitter 70 and its associated reflector 72 shown in FIG. 3. As can be seen in FIG. 3, because the light beam from the photo emitter 70 is angled across the loading station 38 toward its reflector 72, this light beam will be re-established before the loaded pallet completely clears the loading station 38. Thus, an earlier signal is sent to the control unit of the palletizer informing it that the loaded pallet is about to clear the loading station and that the first section of input conveyor segments 58, 60 can be raised and activated to begin conveying an empty pallet into the loading station. A further photo emitter 74 and its associated reflector 76 are positioned on opposite sides of the first segments 58, 60 of the input conveyor first section adjacent to the output conveyor 30. The light beam emitted from this photo emitter 74 is interrupted by an empty pallet being transported by the two segments 58, 60 of the input conveyor first section just before the pallet passes to the two segments 62, 64 of the input conveyor second section. When this light beam is interrupted, a signal is sent to the control unit that causes the control unit to activate the pneumatic actuator 68 of the input conveyor second section segments 62, 64 raising these segments to receive the empty pallet being transported by the input conveyor first section segments 58, 60. By the operation of the input conveyor 50 described above and its associated photo emitters and receptors, an empty pallet is loaded into the loading station 38 in a more time efficient manner.

As explained earlier, in the operation of the palletizer in initially loading layers of objects onto an empty pallet positioned in the loading station, from an elevated position of the carriage assembly 44 as it approaches the infeed section A, the sweeper mechanism 18 and elevator platform 16 are in their relative positions shown in FIG. 6. The carriage assembly 44 moves horizontally to the left as shown in FIG. 1, or to the right as shown in FIG. 2, until the sweeper mechanism 18 is positioned over the area of accumulated objects or the grouping of objects 14 positioned in the infeed section. The flaps 22, 24, 26 of the sweeper mechanism 18 are slightly extended as shown in FIG. 6 as the carriage assembly 44 moves downwardly until the sweeper mechanism 18 is positioned over the grouping of objects 14. At this point in the operation of the prior art palletizer, the flaps 22, 24, 26 would be controlled by the control unit to close around the grouping of objects 14. The sweeping movement of the sweeper mechanism 18 horizontally to the right as viewed in FIG. 1 sweeping the layer of objects over the elevator platform 16 would not begin for a short time period allowing all of the flaps to close. One of the improvements provided by the present invention is in a pair of Hall effect switches 100 provided on the sides of the actuators 29 that open and close the rear flap 26 and on the sides of the pair of actuators 29 that open and close the front flap 24. Hall effect switches are known in the art and provide a signal in response to sensing the passage of the pistons through the piston cylinder actuators 29. These switches 100 provide an early indication signal to the control unit letting it know that the forward and rearward flaps 24, 26 are approaching their closed position and that the sweeping movement of the sweeping mechanism 18 can begin early. By adding the Hall effect switches 100 to the actuators 29 of the front 24 and rear 26 flaps, the time delay for the flaps to close is eliminated and the sweeping movement of the sweeper mechanism 18 is begun earlier.

The sweeper mechanism 18 then sweeps the layer of objects 14 on the elevator plate 16 until it trips a first position switch 102. This first position switch 102 is employed on prior art palletizers and sends a signal to the control unit letting it know that the sweeper mechanism 18 has completed its sweeping motion moving the layer of objects 14 onto the elevator platform 16 and that the elevator platform is now ready to be moved with the carriage assembly 44 to align it in its proper vertical position for unloading the layer of objects onto a pallet. As explained earlier, a photo sensor in the object outfeed section C or the loading station 38 provides the control unit with information indicating that a pallet is present in the loading station. The control unit now moves the carriage assembly 44 vertically upward or downward depending on whether there is an empty pallet in the loading station or whether there is a pallet having one or more layers of objects loaded onto the pallet. The prior art carriage assembly was provided with a photo emitter 104 and an associated reflector 106 that sends a photo beam laterally across the object outfeed section C to detect if there are any layers of objects loaded onto a pallet in the loading station. The carriage assembly 44 is controlled by the control unit to move vertically downwardly until the photo emitter 104 and its receptor 106 detect the presence of a layer of objects on a loaded pallet by an interruption of the light beam passed between the emitter and receptor. If a light beam is not interrupted, the downward movement of the carriage 44 will continue until it reaches the bottom of the elevator section B where it is positioned adjacent an empty pallet. However, in the prior art palletizer, the downward movement of the carriage 44 would not commence until the photo sensor in the object outfeed section C or the loading station 38 detected the presence of an empty pallet in the station. An improvement provided by the present invention reprograms the control unit so that, if no layers of objects loaded on a pallet are detected by the lateral photo emitter 104 and receptor 106, the carriage will begin its downward movement even before the photo receptor in the loading station 38 detects the presence of an empty pallet in the loading station. However, to prevent the carriage 44 from moving to its lowest position in the elevator section B before an empty pallet is positioned in the loading station 38, an upper carriage detector switch 108 is added to the palletizer positioned vertically above the existing lowest position detector switch 110. With the addition of the upper carriage detector switch 110, the carriage 44 can now be controlled by the control unit to begin its vertically downward movement toward the bottom of the elevator section B before an empty pallet is detected in the loading station 38. The downward movement of the carriage will continue until it reaches the added upper carriage detector switch 108. At this point the downward movement of the carriage assembly 44 will be stopped if an empty pallet is not detected in the loading station 38. The downward movement to the lowest position of the carriage detected by the existing lowest positioned detector switch 110 will not begin again until an empty pallet is detected in the loading station. This ensures that the forward edge of the elevator platform 16 will overlap the empty pallet for a smooth sweeping movement of the layer of objects 14 onto the pallet. If an empty pallet is detected in the loading station 38 by the time the carriage assembly 44 reaches the upper carriage detector switch 108, then the downward movement of the carriage assembly will continue until it reaches the bottom of the elevator section as detected by the existing lowest position switch 110. By adding the additional switch 108 to the elevator section B, the carriage assembly 44 and its elevator platform 16 can begin its downward movement before the control unit determines whether or not an empty pallet is present in the loading station. This modification also results in a savings of small increments of time that, when multiplied by continuous operation of the palletizer for an extended period of time become a substantial time savings.

Additional time saving improvements have been added to the carriage assembly 44. After a layer of objects 44 has been swept by the sweeper mechanism 18 onto the elevator platform 16, the sweeper mechanism 18 and elevator platform 16 have their relative positions shown in FIG. 7. These positions are determined by existing sweeper mechanism position switch 102 on the carriage assembly 44. With the elevator platform 16 positioned adjacent the accumulated layer of objects on the supply conveyor 12, the sweeper mechanism 18 is activated to sweep the layer of objects onto the elevator platform 16 until its position is sensed by the horizontal position switch 102. At this point, the horizontal sweeping motion of the sweeper mechanism 18 is stopped by the control unit until vertical positioning movements of the carriage assembly 44 take place. As explained earlier, if the lateral photo emitter 104 and its receptor 106 do not detect the presence of layers of objects stacked on the pallet by their photo beam being interrupted, the carriage assembly 44 will move downward until the beam is interrupted by a layer of objects loaded on a pallet. If a layer of objects has not yet been loaded on a pallet and a new pallet is positioned in the loading station 38, the vertical movement of the carriage assembly 44 will be controlled as explained earlier when describing the operation of the new upper carriage detector switch 108. If the horizontal sweeping movement of the sweeper mechanism 18 has been completed by its position being sensed by the horizontal position switch 102, and no layer of objects is detected by the lateral photo emitter 104 and receptor 106, the control unit will then control the carriage assembly 44 to move downwardly. However, in the prior art palletizer before the downward movement of the carriage assembly 44 would be commenced, the elevator platform 16 would be extended horizontally a short distance to ensure that it would overlap the edge of a pallet loaded in the loading station or the edge of a slipsheet resting on the last loaded layer of objects on the pallet. This would ensure a smooth surface for the sweeper mechanism 18 to sweep the layer of objects off of the elevator platform 16 and onto the pallet or slipsheet. In the sequence of steps of the prior art device, first the elevator platform 16 would be extended forward its short distance to overlap the pallet or slipsheet. Then the carriage assembly 44 would be moved downward slowly until the lateral photo emitter 104 and its receptor 106 detected a layer of objects by an interruption in their light beam. This detection would then stop the downward movement of the carriage assembly 44 positioning the elevator platform 16 adjacent the pallet or slipsheet with the forward edge 112 of the platform slightly overlapping the pallet or slipsheet. The sweeper mechanism 18 would then be operated to sweep horizontally to the right as shown in FIGS. 5–8, sweeping the layer of objects 14 onto the pallet or the slipsheet of the last loaded layer of objects.

In order to speed up the sweeping motion of the sweeper mechanism 18, a second horizontal position switch 114 has been added adjacent the first horizontal position switch 102. In addition, the control unit has been reprogrammed for the presence of the second horizontal position switch 114.

Like the first horizontal switch 102, the second horizontal position switch 114 detects when the sweeper mechanism 118 has been moved to a position adjacent the second position switch 114. In the improved operation of the carriage assembly 44, if the carriage assembly has begun its downward movement in the elevator section B the horizontal sweeping motion of the sweeper mechanism 18 will continue past the first horizontal position switch 102 to the second horizontal position switch 114. This additional horizontal movement of the sweeper mechanism 18 occurs with the additional horizontal movement of the elevator platform 16 as the forward edge 112 of the elevator platform is advanced slightly in order to position it over the pallet or slipsheet to be loaded. This positions the layer of objects 14 to be loaded onto the pallet or slipsheet slightly closer and eliminates the small increment of time it would take to sweep the layer of objects from the position detected by the first horizontal position switch 102 to the position detected by the second horizontal position switch 114. If at the time the horizontal sweeping movement of the sweeper mechanism 118 is detected by the second horizontal position switch 114 the layer of objects has not yet been detected by the lateral photo emitter 104 and its receptor 106 so that the downward movement of the carriage 44 has not stopped, the horizontal movement of the sweeper mechanism 18 will be controlled by the control unit to stop at the position sensed by the second horizontal position switch 114. If however the carriage assembly 44 has completed its downward movement and the top most layer of objects is detected by the lateral photo emitter 104 and its receptor 106, then the horizontal sweeping motion of the sweeper mechanism 18 will continue past the second horizontal position switch 114 sweeping the layer of objects onto the slipsheet or pallet adjacent which the elevator platform 16 has been positioned. Therefore, it can be seen that with the addition of the second horizontal position switch 114, the layer of objects loaded onto the elevator platform 16 is moved slightly forward by the motion of the sweeper mechanism 18 to the second position switch 114 as the carriage assembly moves downwardly to a position adjacent the pallet or slipsheet to be loaded. In the prior art, the horizontal movement of the sweeper mechanism 18 from the position detected by the existing position switch 102 to the new position switch 114 would not begin until the vertical movement of the carriage assembly 44 had stopped. By allowing that increment of horizontal movement to take place while the carriage assembly 44 is being vertically positioned results in the savings of time.

Figure 8:
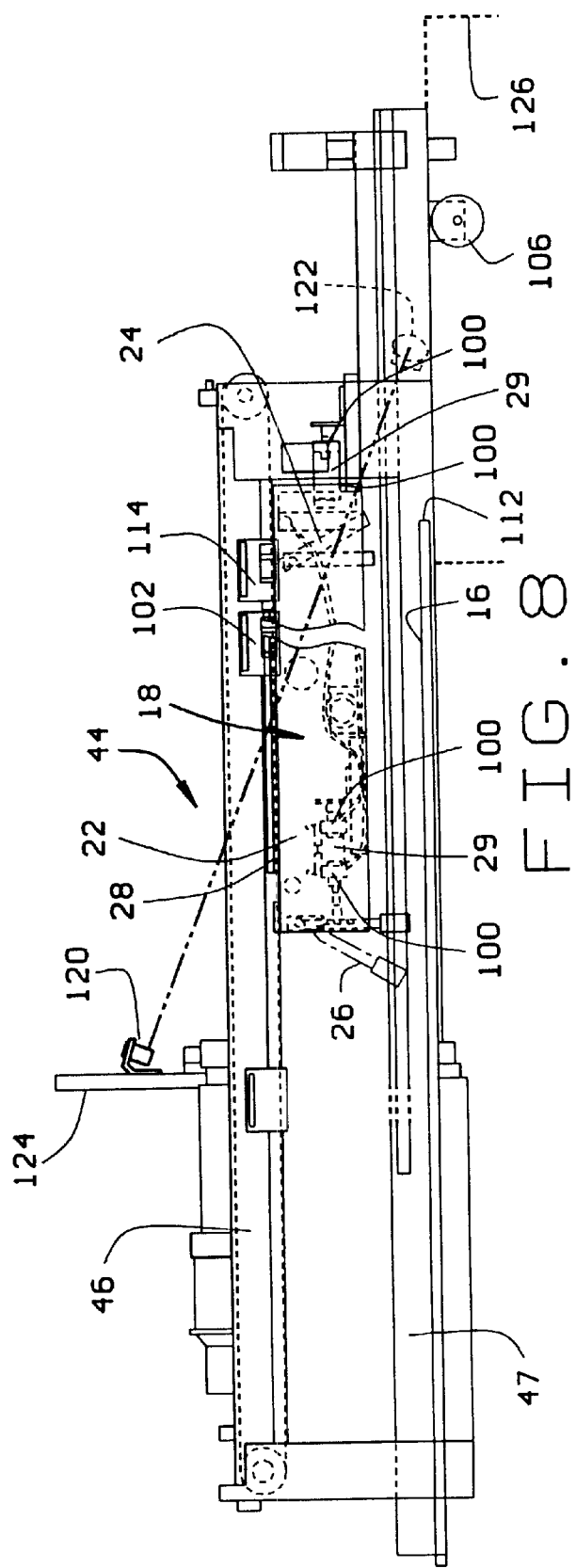
Figure 9:
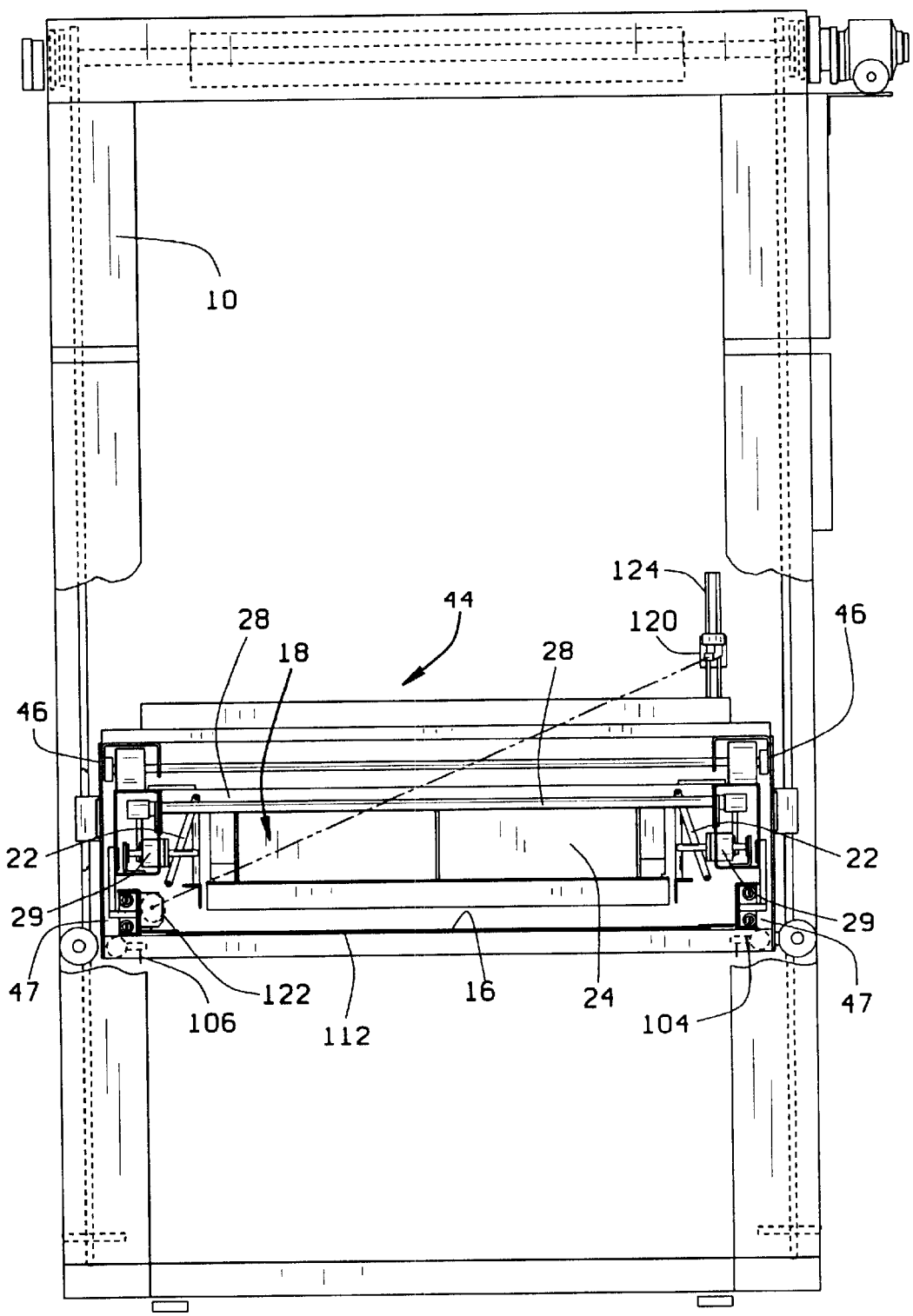
FIG. 9 is an end elevation view of the carriage assembly.

The vertical positioning movements of the carriage assembly 44 to position the forward edge 112 of the elevator platform 16 over the pallet or a slipsheet covering a layer of objects loaded onto a pallet always takes place with the slower, downward movement of the carriage assembly. If the sweeper mechanism 18 sweeps a layer of objects onto the elevator platform 16 and an existing layer of objects is not detected by the lateral photo emitter 104 and its receptor 106, the carriage assembly 44 will be controlled by the control unit to begin its vertically downward positioning movement until a layer of objects is detected by the lateral photo emitter 104 and its receptor 106. However, if a layer of objects is swept by the sweeper mechanism 18 onto the elevator platform 16 and the lateral photo emitter 104 and its receptor 106 detect a layer of objects loaded on the pallet, then the control unit controls the carriage assembly 44 to first move vertically upwardly until the photo emitter 104 and its receptor 106 no longer detect a layer of objects loaded on the pallet. This tells the control unit that the carriage assembly 44 has been moved above the last loaded layer of objects on the pallet and can then begin its downward positioning movement to position the elevator platform 16 adjacent the pallet or slipsheet to be loaded in the same manner discussed above when no layer of objects is initially detected by the photo emitter 104 and its receptor 106 and the carriage assembly is controlled to move downwardly. In the prior art palletizer, the control unit would control the carriage assembly 44 to move upward at a faster rate than its positioning movement downward. This upward movement would continue until the photo beam between the lateral emitter 104 and the receptor 106 was no longer interrupted by layers of objects, letting the control unit know that the carriage assembly 44 had moved sufficiently upwardly. However, the momentum of the rapid upward movement of the carriage assembly 44 would cause it to move well above the last loaded layer of objects on the pallet, sometimes one or two feet above. It would then take a period of time for the control unit to reverse the upward movement of the carriage assembly 44 causing it to move at its slower positioning rate downwardly until the last loaded layer of objects on the pallet was detected by an interruption in the light beam passed between the lateral emitter 104 and its receptor 106. In order to provide the control unit with an early signal that the carriage assembly 44 has been elevated sufficiently above the last layer of objects stacked on the pallet in the loading station, a vertical positioned photo emitter 120 and its associated receptor 122 have been added to the carriage assembly 44. As shown in FIGS. 6–9, the vertical position photo emitter 120 is elevated by a support 124 above the carriage assembly 44 and is angled downwardly toward its associated receptor 122. Represented in dashed lines 126 in FIGS. 7 and 8 is the top of the last loaded layer of objects on the pallet and its covering slipsheet.

In operation of the prior art palletizer, the rapid upward movement of the carriage assembly 44 would continue until the lateral photo emitter 104 and its receptor 106 cleared the top of the last layer of objects 126 loaded on the pallet. Time would then be lost as the upward movement of the carriage assembly 44 was brought to a halt and its vertically positioning downward movement, which is slower than its upward movement, was commenced by the control unit. By adding the angled vertical position photo emitter 120 and its associated receptor 122, it can be seen in FIG. 7 that the light beam between this emitter 120 and its receptor 122 will be reestablished before the light beam between the lateral photo emitter 104 and its receptor 106 on upward movement of the carriage assembly 44. The reestablishment of the light beam between the vertical position photo emitter 120 and its receptor 122 provides an early indication to the control unit to stop the vertically upward movement of the carriage assembly 44 and begin the slower, more deliberate downward positioning movement. On the downward positioning movement of the carriage assembly 44 the lateral photo emitter 104 and its receptor 106 are still relied on to provide the control unit with a signal indicating that the elevator platform 16 has been positioned adjacent the last loaded layer of objects on the pallet by the interruption of the light beam between this emitter 104 and receptor 106. However, because the added vertical position photo emitter 120 and its receptor 122 provide and earlier signal to the control unit that the carriage assembly 44 is approaching its vertical position where the lateral photo emitter 104 and its receptor 106 will clear the top most layer of objects as indicated by the dashed line 126, the operation of the improved palletizer is able to save additional time by stopping the upward movement of the carriage assembly 44 earlier and beginning its downward vertical positioning movement earlier. When the upward movement of the carriage assembly 44 stops and its downward vertical positioning movement begins, then the control unit controls the elevator platform 16 and sweeper mechanism 18 to move slightly forward from the position of the sweeper mechanism 18 detected by the existing horizontal position switch 102 to the position of the added horizontal position switch 114 as explained earlier. When the existing lateral photo emitter 104 and its receptor 106 detect that the downward movement of the carriage 44 has positioned the elevator platform 16 adjacent the last loaded layer of objects on the pallet with the elevator platform forward edge 112 overlapping the slipsheet, the sweeper mechanism 18 is then activated to sweep the layer of objects horizontally off of the elevator platform 16 and onto the slipsheet over the last loaded layer of objects.

When the sweeping motion of the sweeper mechanism 18 has been completed, the motion must be reversed. This requires that the rear flap 26 and the pair of side flaps 22 be pivoted open slightly to disengage from the sides of the layer of objects but also requires the front flap 24 to be completely raised horizontally to clear the layer of objects when the layer of objects is the top most layer to be loaded on the top of the stack of objects supported by the pallet. If the layer of objects is not the top most layer, then the carriage assembly 44 can be raised relative to the loaded pallet while the flaps are moved toward their open positions making it unnecessary for the forward flap 24 to be completely raised to clear the top loaded layer as the sweeper mechanism is retracted from this layer. However, where the layer is the top most layer of objects loaded onto the stack on the pallet, the front flap 24 must be completely raised to its horizontal position in order to clear this last loaded layer as the sweeper mechanism 18 is retracted from the layer. The addition of the Hall effect switches 100 on the actuator 29 that moves the front flap 24 saves time in this operation. The Hall effect switch 100 on the actuator 29 that moves the front flap 24 to its completely opened horizontal position detects the passage of the piston in the actuator before it is completely moved to its position where the front flap 24 is oriented horizontally. This gives an early signal to the control unit that the front flap 24 is approaching its completely open, horizontal position, although it has not yet reached that position. This enables the control unit to begin the control of the sweeper mechanism 18 causing the sweeper mechanism to move to the left as viewed in FIGS. 5–8 toward its retracted position over the elevator platform 16 and then continuing on to its position to the left of the carriage assembly where it is over the accumulation area of the supply conveyor 12. In the prior art palletizer, there was a programmed time delay that would prevent the sweeper mechanism 18 from retracting to its left until the time period had expired, thus enabling sufficient time for the actuator 29 to completely open the front flap 24 to its horizontal position. By adding the Hall effect switch 100 to the actuator 29 that opens the front flap 24, an early signal is provided to the control unit that enables it to start the sequence of operations that will cause the sweeper mechanism 18 to move to its retracted position. By elimination of the time delay in moving the sweeper mechanism 18 in the prior art palletizer, the addition of the Hall effect switch to the front flap actuator results in a more time efficient operation of the improved palletizer.

While the present invention has been described by reference to a specific embodiment, it should be understood that modifications and variations of the invention may be constructed without departing from the scope of the invention defined in the following claims.

What is claimed:

1. An apparatus for palletizing objects on a pallet where the objects are arranged in a layer on the pallet, the apparatus comprising:

a supply conveyor for supplying objects to be palletized;

an output conveyor for supporting a pallet to be loaded with layers of objects and for conveying the loaded pallet;

a frame between the supply conveyor and the output conveyor;

a carriage supported by the frame for vertical upward and downward movement of the carriage relative to the frame;

an elevator platform supported by the carriage between the supply conveyor and the output conveyor for receiving a layer of objects from the supply conveyor and vertically positioning the layer of objects relative to the output conveyor prior to the loading of the objects onto the pallet supported by the output conveyor;

a sweep mechanism supported by the carriage above the elevator platform for movement in a horizontal line of the sweep mechanism relative to the carriage and elevator platform to sweep a layer of objects from the supply conveyor onto the elevator platform and then sweep the layer of objects from the elevator platform onto the pallet supported by the output conveyor; and a photo emitter and photo receptor mounted on the carriage for vertical movement with the carriage, the photo emitter and photo receptor being spaced on horizontally opposite sides of the sweep mechanism and positioned relative to each other so that a line between the photo emitter and photo receptor is oriented at an oblique angle relative to the horizontal line of movement of the sweep mechanism.

2. The apparatus of claim 1, further comprising:

a drive system being operable to move the carriage and elevator platform vertically relative to the output conveyor; and a control unit controlling the drive system of the carriage and elevator platform in response to the photo emitter and photo receptor.

3. The apparatus of claim 2, further comprising:

the control unit controls the drive system to move the carriage and elevator platform vertically upward to position the sweep mechanism adjacent a last loaded layer of objects on the pallet, and the control unit controls the drive system to stop the upward vertical movement of the carriage and elevator platform in response to the photo emitter and photo receptor no longer sensing the last loaded layer of objects on the pallet.

4. The apparatus of claim 3, further comprising:

a lateral emitter and lateral receptor being spaced laterally from each other across the sweep mechanism and traverse to the horizontal line of the sweep mechanism, and the control unit controlling the drive system in response to the lateral emitter and lateral receptor.

5. The apparatus of claim 4, further comprising:

the control unit controls the drive system to move the carriage and elevator platform downward until the lateral emitter and lateral receptor sense the last loaded object on the pallet after the control unit stops the drive system from moving the carriage and elevator platform vertically upward.

6. The apparatus of claim 1, further comprising:

one of the photo emitter and photo receptor is positioned vertically above the sweep mechanism and vertically above the other of the photo emitter and photo receptor.

7. The apparatus of claim 6, further comprising:

one of the photo emitter and photo receptor is spaced from the other of the photo emitter and photo receptor horizontally away from the elevator platform toward the output conveyor.

8. The apparatus of claim 7, further comprising:

the one of the photo emitter and photo receptor that is positioned vertically-above the sweep mechanism is spaced from the other of the photo emitter and photo receptor laterally across the sweep mechanism and traverse to the horizontal line of the sweep mechanism.

9. An apparatus for palletizing objects on a pallet where the objects are arranged in a layer on the pallet, the apparatus comprising:

an output conveyor having a loading station where a layer of objects is loaded onto an empty pallet supported on the output conveyor, the output conveyor being selectively operable to convey the pallet supported on the output conveyor and loaded with the layer of objects away from the loading station of the output conveyor;

a frame adjacent the output conveyor loading station;

a carriage supported by the frame, the carriage having a drive system that is operable to move the carriage vertically upward and downward relative to the frame and the output conveyor loading station;

an elevator platform supported by the carriage adjacent the output conveyor loading station, the elevator platform being moveable with the carriage vertically relative to the frame and the output conveyor loading station;

first and second carriage position detectors supported by the frame, the first carriage position detector being positioned on the frame to sense when the elevator platform is positioned a first vertical distance from the output conveyor loading station and the second carriage position detector being positioned on the frame to sense when the elevator platform is positioned a second vertical distance from the output conveyor loading station, the first vertical distance being different from the second vertical distance;

a sweep mechanism supported by the carriage above the elevator platform for movement in a horizontal line of the sweep mechanism relative to the carriage and the elevator platform to sweep a layer of objects onto the elevator platform and then sweep the layer of objects from the elevator platform onto the pallet supported by the output conveyor;

a sensor mounted on the frame and positioned adjacent the output conveyor to detect the presence or absence of a pallet on the output conveyor and in the loading station; and a control unit controlling the drive system of the carriage in response to signals from at least one of the first and second carriage position detectors and the sensor.

10. The apparatus of claim 9, further comprising:

the control unit controls the movement of the carriage to move the elevator platform vertically downward toward the output conveyor loading station until the first carriage position detector senses that the elevator platform is positioned the first vertical distance from the output conveyor loading station, thereafter the sensor senses the presence or absence of a pallet on the output conveyor at the loading station and if a pallet is absent the sensor signals the control unit to control the drive system to stop the carriage vertically downward movement until the presence of a pallet at the loading station is sensed by the sensor at which time the sensor signals the control unit to control the drive system to continue the vertically downward movement of the carriage until the second carriage position detector senses that the elevator platform is positioned the second vertical distance from the output conveyor loading station at which time the control unit controls the drive system to stop the vertically downward movement of the carriage and elevator platform.

11. The apparatus of claim 9, further comprising:

a photo emitter and photo receptor that are mounted on the carriage and are spaced vertically from each other on opposite sides of the sweep mechanism and are spaced horizontally from each other on opposite sides of the sweep mechanism.

12. The apparatus of claim 11, further comprising:

the control unit controls the drive system to move the carriage and elevator platform vertically upward to position the sweep mechanism adjacent a last loaded layer of objects on the pallet, and the control unit controls the drive system to stop the upward vertical movement of the elevator platform in response to the photo emitter and photo receptor no longer sensing the last loaded layer of objects on the pallet.

13. The apparatus of claim 11, further comprising:

the control unit controls the drive system to move the carriage and elevator platform vertically upward with an upward momentum, and the control unit controls the drive system to slow the upward momentum of the elevator platform when the photo emitter and photo receptor no longer sense the last loaded layer of objects on the pallet.

14. The apparatus of claim 11, further comprising:

the photo emitter and the photo receptor are positioned in a line transverse to the horizontal line of movement of the sweep mechanism where the positions of the photo emitter and photo receptor do not interfere with the horizontal movement of the sweep mechanism.

15. The apparatus of claim 11, further comprising:

the photo emitter and the photo receptor are positioned in a line transverse to the vertical movement of the elevator platform where the positions of the photo emitter and photo receptor do not interfere with the vertical movement of the elevator.

16. An apparatus for palletizing objects on a pallet where the objects are arranged in a layer on the pallet, the apparatus comprising:

a pallet loading station that receives empty pallets and loads layers of objects onto the pallets;

an output conveyor in the pallet loading station that supports pallets received by the pallet loading station while layers of objects are loaded onto the pallets by the pallet loading station, the output conveyor has a length that extends in a first direction out of the pallet loading station and the output conveyor is operable to convey a loaded pallet out of the pallet loading station in the first direction along the length of the output conveyor; and an input conveyor that intersects the output conveyor, the input conveyor has a length that extends in a second direction and intersects with the output conveyor, and the input conveyor has first and second sections along the input conveyor length, the input conveyor second section intersects the output conveyor and the input conveyor first section is adjacent the output conveyor but does not intersect the output conveyor, and the input conveyor first section has actuators and the input conveyor second has actuators that are operable to raise and lower the input conveyor first section and the input conveyor second section independently of each other.

17. The apparatus of claim 16, further comprising:

the first direction and second direction are oriented at an angle relative to each other.

18. The apparatus of claim 16, further comprising:

the input conveyor second section intersects the output conveyor in the pallet loading station.

19. The apparatus of claim 16, further comprising:

the length of the output conveyor extends between a first end of the output conveyor and a second end of the output conveyor, the length of the input conveyor extends between a first end of the input conveyor and a second end of the input conveyor, and the input conveyor intersects the output conveyor at the input conveyor second end and at the output conveyor first end.

20. The apparatus of claim 16, further comprising:

a first photo emitter and a first reflector positioned on opposite sides of the output conveyor and the input conveyor.

21. The apparatus of claim 20, further comprising:

a second photo emitter and a second reflector positioned on opposite sides of the input conveyor first section and adjacent the input conveyor second section.

22. The apparatus of claim 20, further comprising:

the first photo emitter and the first reflector are positioned on opposite sides of the intersection of the input conveyor and the output conveyor.

23. An apparatus for palletizing objects on a pallet where the objects are arranged in a layer on the pallet, the apparatus comprising:

a supply conveyor for supplying objects to be palletized;

an output conveyor for supporting a pallet to be loaded with a layer of objects and for conveying the loaded pallet;

an elevator platform between the supply conveyor and the output conveyor for receiving a layer of objects from the supply conveyor and vertically positioning the layer of objects relative to the output conveyor prior to the loading of the objects onto the pallet supported by the output conveyor;

a sweep mechanism connected to the elevator platform for movement in a horizontal direction of the sweep mechanism relative to the elevator platform to sweep a layer of objects from the supply conveyor onto the elevator platform and then sweep the layer of objects from the elevator platform onto the pallet supported by the output conveyor, the sweep mechanism having a frame and a plurality of flaps mounted on the frame for movement between open positions and closed positions relative to the layer of objects to be swept by the sweep mechanism and switches operatively connected to the flaps and the sweep mechanism that cause the sweep mechanism to begin to move in the horizontal direction in response to the flaps approaching their closed positions.

24. The apparatus of claim 23, further comprising:

the flaps have actuators connected between the flaps and the frame that move the flaps between the open and closed positions and the switches are on the actuators.

25. The apparatus of claim 24, further comprising:

the actuators are piston and cylinder actuators and the switches are Hall effect switches.

* * * * *